US012651946B2

(12) United States Patent
Sauer et al.

(10) Patent No.: US 12,651,946 B2
(45) Date of Patent: Jun. 9, 2026

(54) INVERTER ARRANGEMENT FOR AN ELECTRIC MACHINE, AND METHOD FOR PROVIDING AN INVERTER ARRANGEMENT

(71) Applicant: SEG Automotive Germany GmbH, Stuttgart (DE)

(72) Inventors: Florian Sauer, Stuttgart (DE); Michael Sparka, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 231 days.

(21) Appl. No.: 18/392,186

(22) Filed: Dec. 21, 2023

(65) Prior Publication Data

US 2024/0213857 A1 Jun. 27, 2024

(30) Foreign Application Priority Data

Dec. 23, 2022 (DE) ........................ 102022134760 .5

(51) Int. Cl.
*H02K 5/22* (2006.01)
*H02K 11/33* (2016.01)

(52) U.S. Cl.
CPC ............. *H02K 11/33* (2016.01); *H02K 5/225* (2013.01); *H02K 2203/03* (2013.01)

(58) Field of Classification Search
CPC ........... H02K 5/20; H02K 5/22; H02K 5/225; H02K 11/30; H02K 11/33; H02K 2203/03
See application file for complete search history.

(56) References Cited

U.S. PATENT DOCUMENTS

| | | | |
|---|---|---|---|
| 2002/0047504 A1 | 4/2002 | Takahashi | |
| 2020/0195098 A1* | 6/2020 | Shimakawa | ........... H02K 9/227 |
| 2022/0311164 A1* | 9/2022 | Gunermann | ....... B60H 1/00814 |
| 2023/0164923 A1* | 5/2023 | Brewster | .............. H05K 3/3457 |
| | | | 174/263 |

FOREIGN PATENT DOCUMENTS

| | | | | |
|---|---|---|---|---|
| DE | 2338499 A1 | 2/1975 | | |
| DE | 102009020075 A1 | 11/2009 | | |
| JP | 2011114979 A * | 6/2011 | ........... | H01R 12/585 |
| WO | WO-2008146664 A1 * | 12/2008 | ........... | B62D 5/0406 |

OTHER PUBLICATIONS

Takahashi, Machine Translation of WO2008146664, Dec. 2008 (Year: 2008).*
Asanishi, Machine Translaton of JP2011114979, Dec. 2008 (Year: 2008).*

* cited by examiner

*Primary Examiner* — Eric Johnson
(74) *Attorney, Agent, or Firm* — Cozen O'Connor

(57) ABSTRACT

An inverter arrangement for an electric machine includes a housing having a housing opening, a circuit carrier, with electrical components, that is situated in the housing, and on a side facing the housing opening has two direct voltage terminals in the form of contact slots. A terminal element having a terminal element body, two plate-shaped terminal element contact bars, and two terminal element contact pins, one of each of the terminal element contact bars being electrically connected to one of the terminal element contact pins. The terminal element is fastened via the housing opening so that in each case one of the terminal element contact bars protrudes into one of the contact slots and is electrically connected to the contact slot via a solder connection, the terminal element contact pins being situated outside the housing.

15 Claims, 4 Drawing Sheets

A-A

B-B

A-A

INVERTER ARRANGEMENT FOR AN ELECTRIC MACHINE, AND METHOD FOR PROVIDING AN INVERTER ARRANGEMENT

CROSS-REFERENCE TO RELATED APPLICATIONS

This application claims priority to German Patent Application No. DE 102022134760.5 filed Dec. 23, 2022, titled "Sidewise Mounting and Soldering," which is hereby incorporated by reference in its entirety.

TECHNICAL FIELD

The present invention relates to an inverter arrangement for an electric machine, a system comprising an electric machine and such an inverter arrangement, and a method for providing an inverter arrangement.

BACKGROUND

In electric machines, in particular those used as a generator or mild hybrid drive in vehicles, an increasingly higher power density is required. The result, among other things, is that only a small installation space is available for power components of an inverter (converter) of the electric machine. In particular, the layout of a voltage supply terminal of the inverter represents a challenge, which is further heightened by the fact that corresponding terminal components at a voltage supply (battery) in the vehicle vary, depending on the vehicle manufacturer.

SUMMARY

According to the invention, an inverter arrangement for an electric machine, a system comprising an electric machine and such an inverter arrangement, and a method for providing an inverter arrangement having the features of the independent claims are proposed. Advantageous embodiments are the subject matter of the subclaims and of the following description.

The invention provides an inverter arrangement having a particular design of a housing leadthrough, in particular for the direct current terminals of the inverter, which requires only a small installation space. In a circuit carrier inside the inverter housing, two direct voltage terminals in the form of contact slots are provided, into which two plate-shaped terminal element contact bars of a terminal element or leadthrough element protrude, and which are electrically connected in each case to one of the contact slots via a solder connection. The main plane of extension of the plate-shaped terminal element contact bars is thus in particular (essentially) perpendicular to the main plane of extension of the circuit carrier. As a result of this configuration, the terminal element contact bars can directly engage or protrude into the contact slots of the circuit carrier and be easily soldered thereto.

The circuit carrier is used in particular for carrying electrical components of the inverter, such as in particular power components (transistors, for example, preferably MOSFETs or IBGTs), filter components (inductors and capacitors, for example), etc. The interaction of the contact slot and the ("perpendicular") contact bar also results in very short electrical connections between the electrical components and the direct voltage terminals. Furthermore, the direct voltage terminals may be flexibly adapted to battery terminal components of various manufacturers by using different terminal elements (which, however, on the inner side of the housing or with regard to the terminal element contact bars are structurally identical). For this purpose, two terminal element contact pins are provided at the terminal element, in particular on the outer side of the housing, and one of the terminal element contact bars is electrically connected in each case to one of the terminal element contact pins.

The terminal element or leadthrough element has a section on the inner side of the housing that includes the terminal element contact bars, and a section on the outer side of the housing that includes the terminal element contact pins.

For example, an electrically conductive connection, for example a copper conductor, may be applied, for example cast or extrusion-coated, in the terminal element body, between the terminal element contact bars, at the section of the terminal element on the inner side of the housing and the terminal element contact pins on the section of the terminal element on the outer side of the housing. The terminal element may be connected to a voltage supply, in particular a vehicle battery, by means of the terminal element contact pins. The terminal element contact pins may be adapted to the battery terminal components of various vehicle manufacturers; i.e., their shape (diameter, length, and configuration) may vary, depending on the manufacturer. Since the adaptation of the terminal element to different vehicle manufacturers is limited to the configuration of the terminal element contact pins, little adaptation effort is involved.

According to one embodiment, the terminal element body is made of an electrical insulator, in particular plastic and/or ceramic. This allows reliable manufacturing and use for the intended purpose.

According to one embodiment, the terminal element body is an injection-molded part, in particular a plastic injection-molded part or a ceramic powder injection-molded part. This allows easy and flexible manufacturing.

According to one embodiment, the terminal element may include at least one terminal element alignment element that is configured to align the terminal element at the housing opening or position it at the housing. In particular, it may be provided that a terminal element alignment element cooperates with a housing alignment element in order to align the terminal element at the housing opening. For example, one of the terminal element alignment elements and the housing alignment elements may be a protrusion or a lug, and the other may be a recess or indentation (in the manner of a tongue and groove connection). In particular, two terminal element alignment elements may be situated at the section of the terminal element on the inner side of the housing. They may preferably be mounted on two opposite sides of the terminal element in such a way that in the installed state they are situated at two opposite sides of the housing opening of the housing. The terminal element alignment elements ensure a correct position of the terminal element contact bars of the terminal element in the contact slots of the circuit carrier.

According to one embodiment, the terminal element is screwed to the housing. Such a connection may be quickly and securely established, and is made before the terminal element contact bars are soldered in order to avoid stresses on the solder joint. This allows a simple and easily maintained attachment of the terminal element to the housing. Alternatively or additionally, the terminal element may be connected to the housing in some other way, for example by pressing or riveting.

According to one embodiment, a sealing element is situated between the terminal element and the housing, in particular a sealing element that completely encloses the housing opening, in particular in order to close the housing opening in a (sufficiently) fluid-tight manner. In one embodiment, this may be a liquid sealing element that assumes its final shape (seal geometry) and is cured after the terminal element and housing are applied and connected. Alternatively, the sealing element may be designed as a molded-on seal, a flat seal, and the like, the specific shape advantageously being selected depending on the requirements and the available installation space.

According to one embodiment, at least one of the terminal element contact bars has a trapezoidal shape in a longitudinal section. On the one hand this facilitates the insertion of the terminal element contact bars into the contact slots of the circuit carrier during installation, and on the other hand reduces their space requirements. In particular, the trapezoidal shape of the terminal element contact bars may be such that in the installed state of the terminal element, an edge of the contacts facing electrical components has a beveled design.

According to one embodiment, in a plane parallel to the main plane of extension of the terminal element contact bars and in a direction perpendicular to the main plane of extension of the circuit carrier, the electrical components are situated farther from the circuit carrier than are the terminal element contact bars. This also allows use to be made of an installation space extending above or below the terminal element contact bars.

According to one embodiment, the electrical connection via the solder connection takes place by means of selective wave soldering. Selective wave soldering is a method for selective soft soldering in which joining parts, in the present case the terminal element contact bars and the contact slots of the circuit carrier, are immersed in a locally delimited splash bath of liquid solder and soldered. Selective wave soldering enables rapid soldering with good controllability of the soldering parameters, such as soldering level, solder wave height, and soldering temperature.

According to one embodiment, the electrical connection via the solder connection takes place in a combined soldering process, with the production of further solder connections on the circuit carrier. In particular, the selective wave soldering of the terminal element contact bars may take place together with other solder joints on the circuit carrier in an automated soldering process, in the same work operation. As a result, a separate method step for attaching the terminal element contact bars is not necessary, so that the effort for manufacturing the inverter may be reduced.

A system according to the invention comprises an inverter according to the invention and an electric machine. The system may be used to convert electrical energy into mechanical energy and vice versa, in particular in a vehicle, for example as a so-called mild hybrid drive in a vehicle.

Further advantages and embodiments of the invention result from the description and the appended drawings.

The invention is schematically illustrated in the drawings, based on exemplary embodiments, and described below with reference to the drawings.

DETAILED DESCRIPTION

Figure 1B:
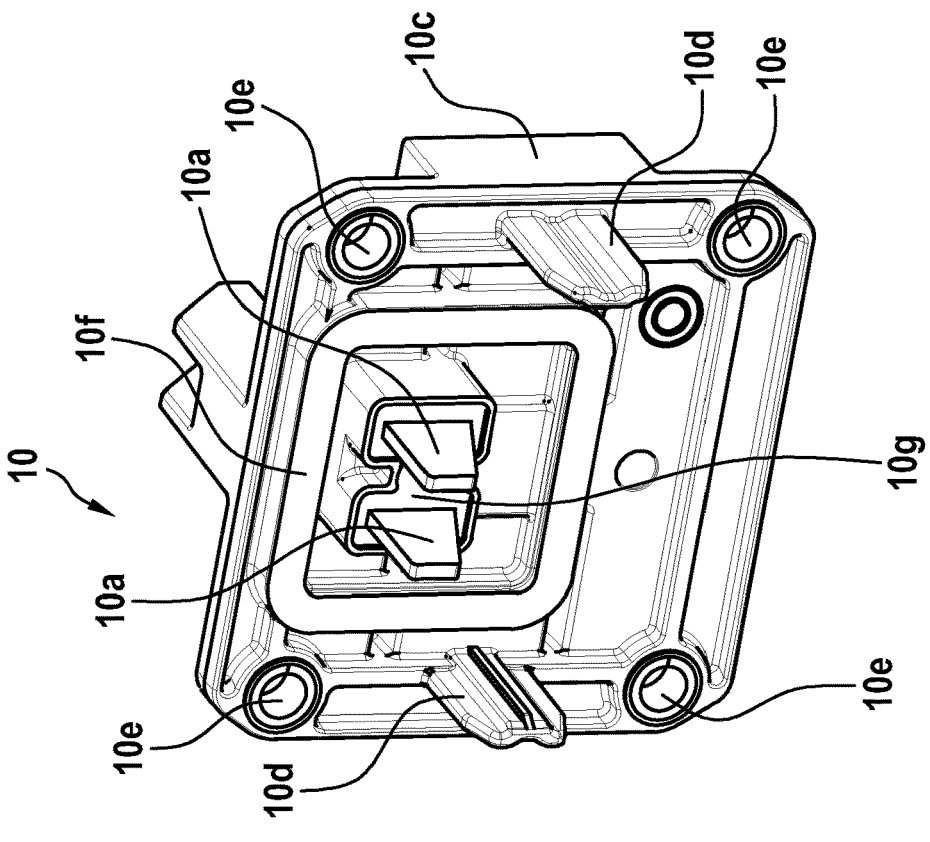
FIGS. 1a through 1d show different parts and views of one embodiment of an inverter arrangement according to the invention in a schematic illustration.

One embodiment of an inverter arrangement according to the invention is described below in an interrelated and all-encompassing manner, with reference to the figures. Identical elements are denoted by the same reference numerals in the figures.

Figure 1A:
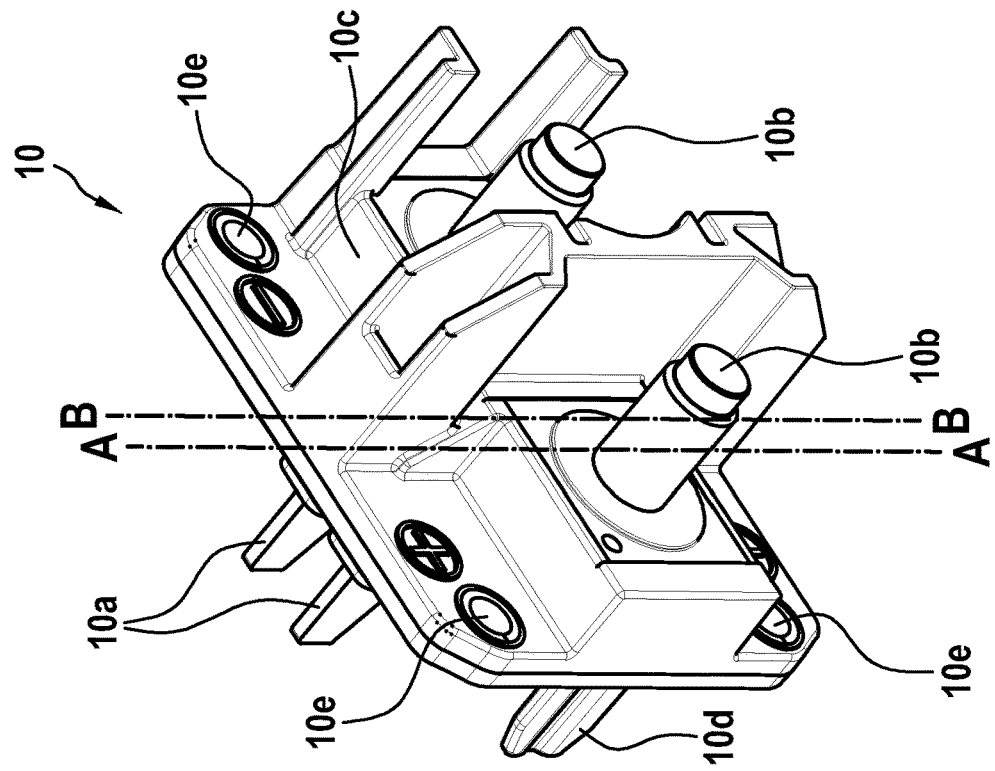
Figure 1D:
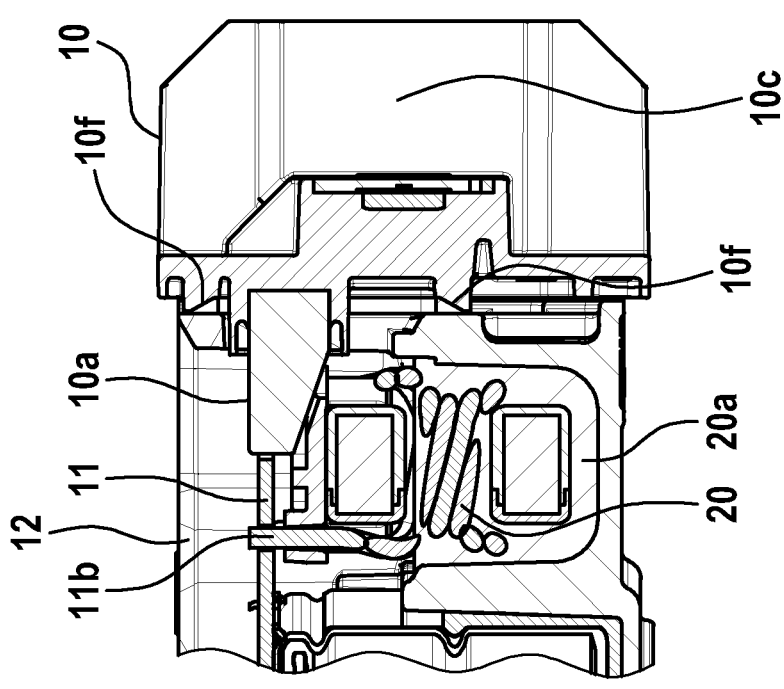
Figure 1C:
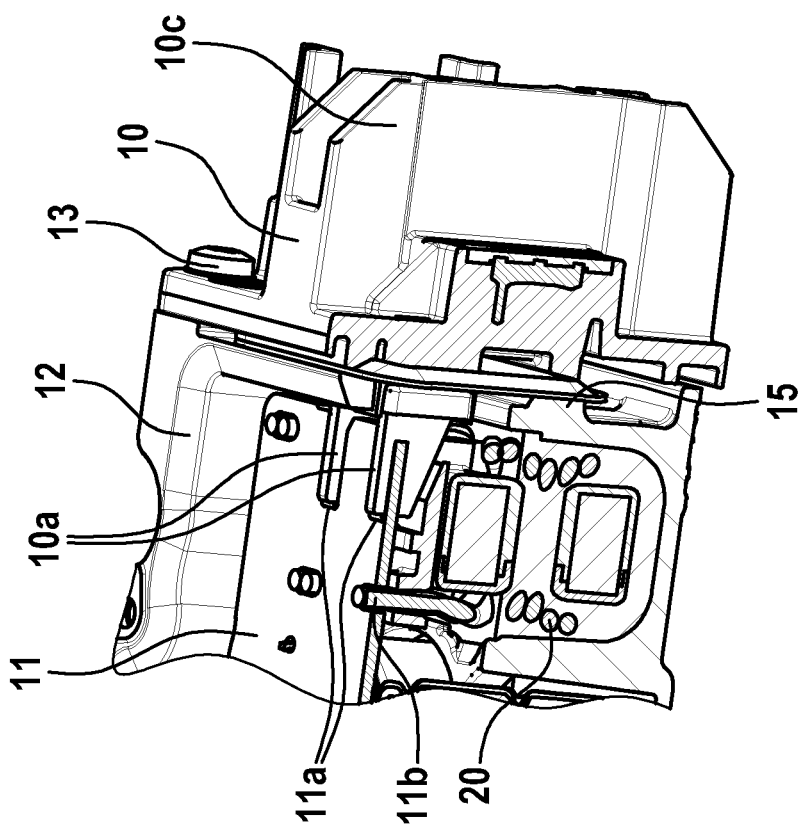

FIGS. 1a through 1d schematically show an illustration of one exemplary embodiment of a terminal element 10 of an inverter arrangement according to the invention. FIGS. 1a and 1b show the terminal element 10 by itself in a perspective view from two different directions, and FIGS. 1c and 1d show the terminal element 10 and a portion of a housing 12, with a housing opening 12a, containing a circuit carrier 11 of an inverter arrangement, in a sectional view along section planes A-A and B-B, respectively, indicated in FIG. 1a.

Figure 2C:
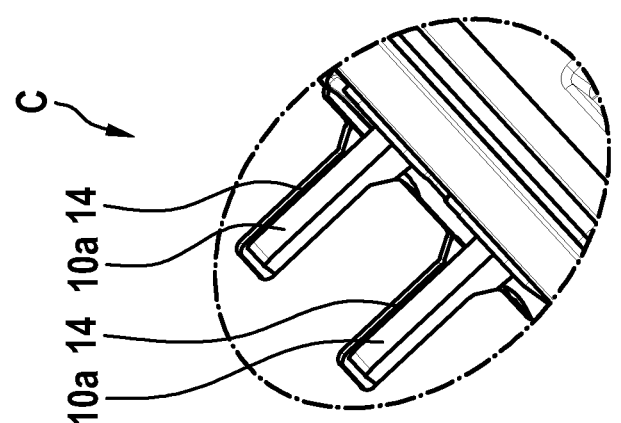
FIGS. 2a through 2c schematically show further details of the embodiment of the inverter arrangement according to the invention from FIGS. 1a through 1d.
Figure 2B:
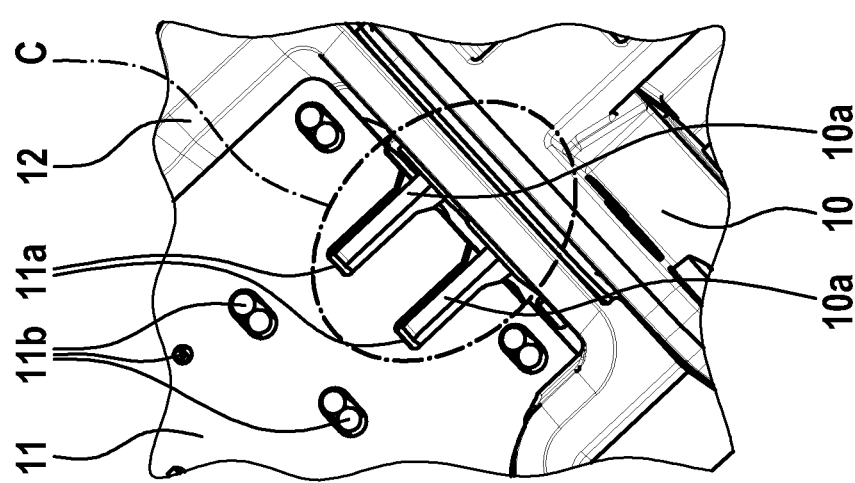
Figure 2A:
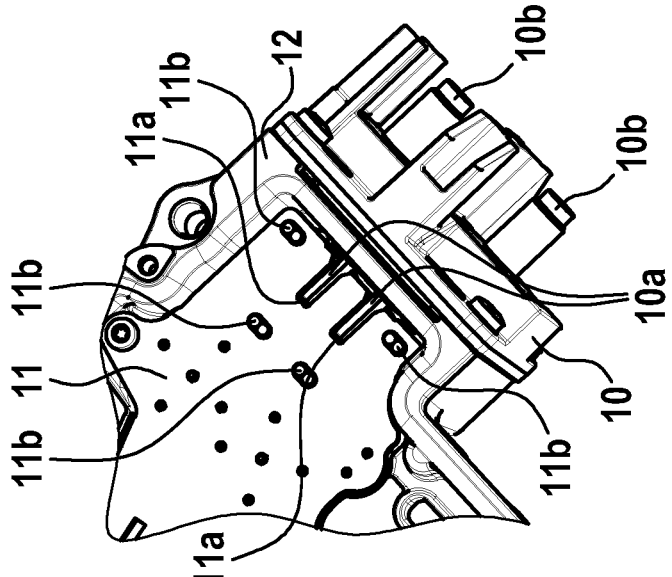

FIGS. 2a through 2c schematically show portions of the inverter arrangement in a top view. FIG. 2a shows the terminal element 10, the housing 12, and a detail of the circuit carrier 11 in a top view. FIG. 2b shows an enlarged detail from FIG. 2a, and FIG. 2c shows a detail from FIG. 2b.

FIG. 1a shows a section of the terminal element 10 on the outer side of the housing; in the installed state (i.e., when the terminal element 10 is fastened to the housing 12) this section is situated on an outer side of the housing 12 of the inverter arrangement (also see FIG. 1c or 1d). FIG. 1b shows a section of the terminal element 10 on the inner side of the housing; in the installed state this section is situated on an inner side of the housing 12 of the inverter arrangement (also see FIG. 1c or 1d).

The terminal element 10 shown includes a terminal element body 10c, two plate-shaped terminal element contact bars 10a and two terminal element alignment elements 10d in the form of protruding lugs at the section on the inner side of the housing, and two terminal element contact pins 10b at the section on the outer side of the housing.

The terminal element contact pins 10b are used for connection to a voltage supply, for example a vehicle battery (not illustrated). The terminal element contact pins 10b may be adapted to battery terminal components of various vehicle manufacturers; i.e., their shape (diameter, length, and configuration) may vary, depending on the manufacturer. The terminal element contact bars 10a are electrically connected to the terminal element contact pins 10b through the terminal element body 10c, for example via appropriate leadthrough conductors (not shown).

In addition, the illustrated terminal element 10 has boreholes in the terminal element body 10c (in the present case, at four corners), a socket 10e being accommodated in each borehole. This allows a screw connection of the terminal element 10 to the housing 12 using screws 13 (also see FIG. 1c), and serves to mechanically fix the terminal element 10 to the housing 12.

As is apparent in FIG. 1b, the two lugs 10d are mounted on two opposite sides of the terminal element 10, and are used to align the terminal element at the housing 12 and position it in such a way that the terminal element contact bars 10a engage with contact slots 11a of the circuit carrier 11 (also see FIG. 1c). For this purpose, each lug 10d can engage with an associated indentation 12b (see FIG. 3b) in the housing 12. The lugs 10d have insertion bevels which simplify the installation of the terminal element 10 in the housing 12. In addition, mounted on the inner side of the terminal element 10 is a frame 10f, which is used to seal off the housing opening 12a and which in the installed state rests on an outer side of the housing (also see FIG. 1d). The sealing of the terminal element contact bars 10a with respect to the terminal element body 10c is ensured in the interior with the aid of a potting pocket 10g, which is integrated into the geometry of the terminal element 10 and is filled with a sealing material.

In addition, a sealing element 15 which in particular completely encloses the housing opening 12a is situated between the terminal element 10 and the housing 12, in order to close the housing opening 12a in a (sufficiently) fluid-tight manner. This may be a liquid sealing element that assumes its final shape (seal geometry) and is cured after the terminal element 10 and the housing 12 are applied and connected. Alternatively, the sealing element may be designed as a molded-on seal, a flat seal, and the like, the specific shape advantageously being selected depending on the requirements and the available installation space.

The terminal element 10, including the interfaces with the housing 12, is thus completely sealed off from the outside; i.e., the housing opening 12a is closed (in a sufficiently fluid-tight manner).

In FIG. 2a, the terminal element 10 is connected to the housing 12, and its terminal element contact bars 10a engage with the contact slots 11a of the circuit carrier 11, which is apparent in an enlarged view in FIG. 2b. FIG. 2c illustrates, in an area C from FIG. 2b, a solder connection 14 between the plate-shaped terminal element contact bars 10a and the contact slots 11a. In the exemplary embodiment shown, the terminal element contact bars 10a protrude (slightly) beyond a top side of the circuit carrier 11, and the solder connection 14 extends circumferentially around the terminal element contact bars 10a on the top side of the circuit carrier 11.

Figures 3A, 3B, 3C:
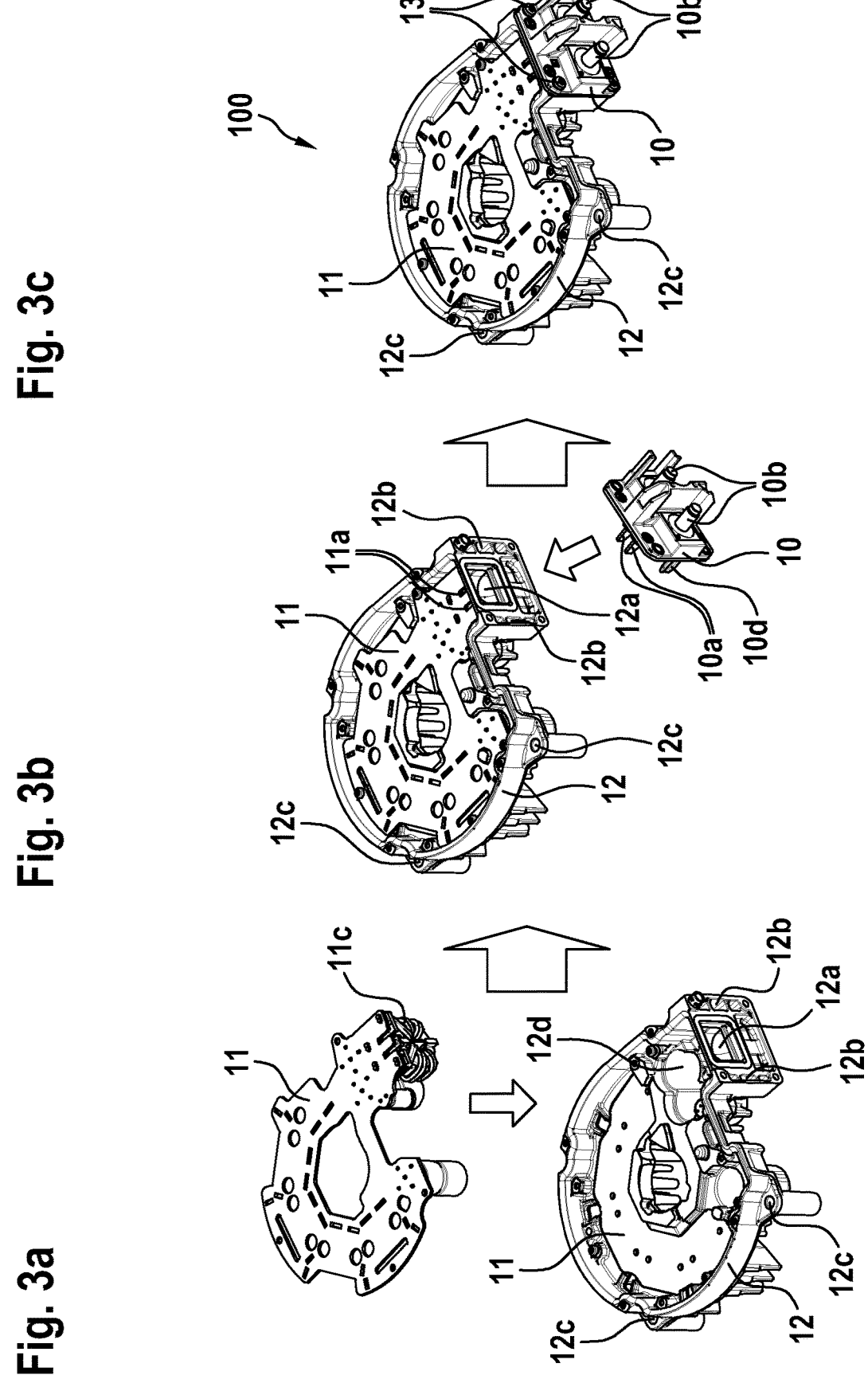
FIGS. 3a through 3c schematically show one exemplary embodiment of a method according to the invention, based on the embodiment of the inverter arrangement according to the invention from FIGS. 1 and 2.

Electrical components, in particular power components (diodes or transistors, for example, preferably MOSFETs or IBGTs), filter components (inductors and capacitors, for example) and their electrical connection paths, etc., are situated on the circuit carrier. FIGS. 1c and 1d show an inductor 20 as a filter component, and FIG. 3a shows the inductor and two capacitors. In the present case, the electrical components 20 are situated at the bottom side of the circuit carrier 11 and are connected thereto via terminal contact points 11b on the top side of the circuit carrier 11.

Based on FIGS. 1c and 1d, it is apparent that the perpendicular arrangement of the terminal element contact bars 10a in the contact slots 11a of the circuit carrier 11 enables a short current path between the terminal element contact pins 10b and the components 20, and at the same time allows sufficient stability and positional accuracy of the terminal element contact bars 10a, in particular in comparison to thinner wires.

The terminal element contact bars 10a have a trapezoidal shape in a longitudinal section, as shown in FIG. 1d. The trapezoidal shape is such that a lower edge of the terminal element contact bars 10a is beveled, so that they can be positioned close to the components 20. In this way, the current path between terminal element contact pins 10b and the components 20 may be further shortened and the required installation space may be minimized. In a plane parallel to the main plane of extension of the terminal element contact bars (plane of the drawing in FIG. 1d) and in a direction perpendicular to the main plane of extension of the circuit carrier 11 (in FIG. 1d, at the bottom), the electrical components 20 are situated farther from the circuit carrier 11 than are the terminal element contact bars 10a, in the present case, farther below. In other words, the electrical components 20, viewed from the circuit carrier, are situated here below the terminal element contact bars 10a. The terminal element contact bars 10a may be positioned partially or completely above the electrical components 20. This also allows use to be made of the installation space extending below the terminal element contact bars.

FIGS. 3a through 3c schematically show one exemplary embodiment of the method according to the invention, based on the exemplary embodiment of the inverter arrangement 100 explained above.

As shown in FIG. 3a, initially the housing 12 is provided, which in the present example has an open top side that is to be subsequently closed by a suitable cover, and the housing opening 12a in a side face. In the exemplary embodiment shown, fairly small recesses or indentations 12b are provided at both sides, next to the housing opening 12a, and are used to align the terminal element 10 at the housing 12.

In addition, the illustrated housing 12 on its bottom side has cooling ribs, or for a liquid-cooled inverter, a separately mounted cooling tube, and along its circumference has fastening sockets 12c via which the housing 12 may be mounted on an electric machine (not illustrated).

The circuit carrier 11 is arranged and mounted in the housing 12, and on a bottom side has a filter component 20 that may be immerged into corresponding recesses in the housing 12 and fixed and thermally attached, using a heat-conducting paste 20a. The circuit carrier 11 is arranged in the housing 12 in such a way that its contact slots 11a are situated on a side facing the housing opening 12a of the housing 12.

In a further step, as illustrated in FIG. 3b, the terminal element 10 is mounted on an outer side of the housing 12, via its housing opening 12b, in such a way that the terminal element contact bars 10a protrude into the contact slots 11a of the circuit carrier 11. For this purpose, the lugs 10d may be pushed into the recesses 12b next to the housing opening 12a, as a result of which the terminal element 10 is aligned at the housing 12, and its terminal element contact bars 10a are positioned in the contact slots 11a of the circuit carrier 11.

In a further step, the terminal element 10 may be fixedly connected to the housing 12 via the screws 13 before the terminal element contact bars 10a of the terminal element 10 are soldered (not illustrated) to the contact slots 11a of the circuit carrier 11, in a last step, in order to produce the solder connection 14. The soldering may also take place before the terminal element 10 is screwed to the housing 12, provided that the terminal element 10 is fastened securely enough to the housing 12 via the lug 10d, for example.

The terminal element contact bars 10a and the contact slots 11a may be jointly soldered to other contact points of the circuit carrier, for example together with the terminal contact points 11b of the filter component 20. As a result, a separate method step for attaching the terminal element contact bars is not necessary, so that the effort for manufacturing the inverter may be reduced. In particular, the solder connections 14, 11b may be produced in an automated soldering process by means of selective wave soldering.

Based on FIGS. 3a through 3c, it is apparent that the described embodiment of the inverter arrangement may be quickly and easily manufactured.

The invention claimed is:

1. An inverter arrangement (100) for an electric machine, comprising:

a housing (12) having a housing opening (12a), a circuit carrier (11), with electrical components (20), that is situated in the housing (12) the circuit carrier (11) having an edge facing the housing opening (12a) and on the edge facing the housing opening (12a) has two direct voltage terminals in the form of contact slots (11a) that extend to the edge of the circuit carrier (11), a terminal element (10) having a terminal element body (10c), two plate-shaped terminal element contact bars (10a), and two terminal element contact pins (10b), one of each of the terminal element contact bars (10a) being electrically connected to one of the terminal element contact pins (10b), wherein the terminal element (10) is fastened via the housing opening (12a) so that in each case one of the terminal element contact bars protrudes through the edge of the circuit carrier (11) and into one of the contact slots (11a) and is electrically connected to the contact slot via a solder connection (14), the terminal element contact pins being situated outside the housing (12).

2. The inverter arrangement (100) according to claim 1, wherein the terminal element body (10c) is made of an electrical insulator.

3. The inverter arrangement (100) according to claim 1, wherein the terminal element body (10c) is an injection-molded part.

4. The inverter arrangement (100) according to claim 1, wherein the terminal element (10) includes a terminal element alignment element (10d) that is configured to align the terminal element (10) at the housing opening (12a).

5. The inverter arrangement (100) according to claim 1, wherein the terminal element (10) is screwed to the housing (12).

6. The inverter arrangement (100) according to claim 1, wherein a sealing element (15) is provided between the terminal element (10) and the housing (12), in particular a liquid sealing element, in particular a sealing element that completely encloses the housing opening (12a).

7. The inverter arrangement (100) according to claim 1, wherein at least one of the terminal element contact bars (10a) has a trapezoidal shape in a longitudinal section.

8. The inverter arrangement (100) according to claim 1, wherein in a plane parallel to a main plane of extension of the terminal element contact bars (10a) and in a direction perpendicular to the main plane of extension of the circuit carrier (11), the electrical components (20), viewed from the circuit carrier (11), are situated behind the terminal element contact bars (10a).

9. A system comprising an electric machine and an inverter arrangement (100) according to claim 1.

10. A method for providing an inverter arrangement (100), comprising the steps:

providing a housing (12) having a housing opening (12a), inserting a circuit carrier (11) having an edge facing the housing opening (12a) that includes two direct voltage terminals in the form of contact slots (11a) that extend to the edge of the circuit carrier (11), together with electrical components (20), into the housing (12) so that the contact slots (11a) face the housing opening (12a), arranging a terminal element (10) that includes a terminal element body (10c), two plate-shaped terminal element contact bars (10a), and two terminal element contact pins (10b), each of the terminal element contact bars (10a) being electrically connected via the housing opening (12a) to one of the terminal element contact pins (10b), so that in each case one of the terminal element contact bars protrudes through the edge of the circuit carrier (11) and into one of the contact slots (11a), electrically connecting each of the terminal element contact bars (10a) to one of the contact slots via a solder connection (14).

11. The method according to claim 10, wherein the electrical connection via the solder connection (14) takes place by means of selective wave soldering.

12. The method according to claim 10, wherein the electrical connection via the solder connection (14) takes place in a combined soldering process, with the production of further solder connections on the circuit carrier (11).

13. The method according to claim 10, wherein the terminal element (10) is positioned at the housing (12) by means of at least one terminal element alignment element (10d).

14. The method according to claim 10, wherein the terminal element (10) is screwed to the housing (12).

15. The method according to claim 10, wherein a sealing element (15) is situated around the housing opening (12a).

* * * * *